United States Patent [19]

Bühler et al.

[11] Patent Number: 4,985,043
[45] Date of Patent: Jan. 15, 1991

[54] MIXTURES OF MONOAZO DYES CONTAINING HALOGEN AND CYANO SUBSTITUENTS

[75] Inventors: Ulrich Bühler, Alzenau; Manfred Hähnke, Kelkheim; Reinhard Kühn, Frankfurt am Main; Margarete Boos, Hattersheim, all of Fed. Rep. of Germany

[73] Assignee: Cassella Aktiengesellschaft, Frankfurt am Main, Fed. Rep. of Germany

[21] Appl. No.: 323,876

[22] Filed: Mar. 15, 1989

[30] Foreign Application Priority Data

Mar. 30, 1985 [DE] Fed. Rep. of Germany ....... 3810726

[51] Int. Cl.$^5$ .................. C09B 67/22; C09B 29/085; D06P 1/18; D06P 3/54
[52] U.S. Cl. ......................... 8/639; 534/573; 534/850; 534/856; 534/575; 534/887; 534/640; 534/644
[58] Field of Search .................. 534/537 M, 850, 856; 8/639

[56] References Cited

U.S. PATENT DOCUMENTS

| | | | |
|---|---|---|---|
| 3,954,395 | 5/1976 | Leverenz | 534/573 X |
| 4,381,262 | 4/1983 | Buhler et al. | 534/573 X |
| 4,405,330 | 9/1983 | Bergmann et al. | 534/573 X |
| 4,537,597 | 8/1985 | Bergmann et al. | 534/573 X |

FOREIGN PATENT DOCUMENTS

| | | | |
|---|---|---|---|
| 0147783 | 7/1985 | European Pat. Off. | 534/573 |
| 0279272 | 8/1987 | European Pat. Off. | 534/573 |
| 3004652 | 8/1981 | Fed. Rep. of Germany | 534/573 |
| 0217231 | 1/1985 | German Democratic Rep. | 534/573 |
| 55-165957 | 12/1980 | Japan | 534/573 |
| 57-42767 | 3/1982 | Japan | 534/573 |
| 58-40360 | 3/1983 | Japan | 534/573 |
| 63-213566 | 9/1988 | Japan | 534/573 |
| 63-213571 | 9/1988 | Japan | 534/573 |
| 2178751 | 2/1987 | United Kingdom | 534/573 |

*Primary Examiner*—Floyd D. Higel
*Attorney, Agent, or Firm*—Connolly and Hutz

[57] ABSTRACT

Mixtures of monoazo dyes suitable for dyeing and printing hydrophobic fiber materials and mixtures thereof with natural fibers contain one or more dyes of the formula I

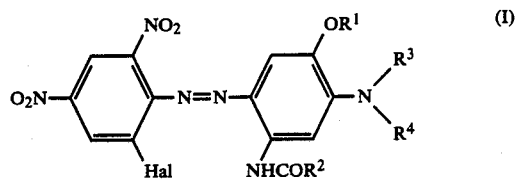

and one or more dyes of the formula II

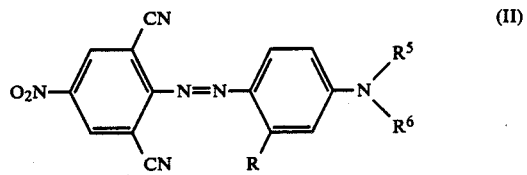

in which Hal denotes bromo or chloro; $R^1$ and $R^2$, independently of one another, denote methyl or ethyl; $R^3$, $R^4$, $R^5$ and $R^6$, independently of one another, denote linear alkyl having 1 to 4 carbon atoms or alkenyl having 3 or 4 carbon atoms; and R denotes methyl, acetylamino, propionylamino, i-butyrylamino, or n-butyrylamino.

7 Claims, No Drawings

MIXTURES OF MONOAZO DYES CONTAINING HALOGEN AND CYANO SUBSTITUENTS

The invention relates to mixtures of monoazo dyes which are characterized in that they consist of one or more dyes of the general formula I

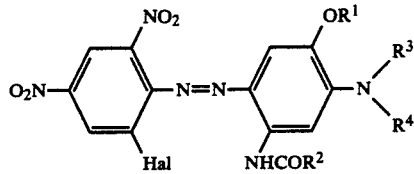

and one or more dyes of the general formula II

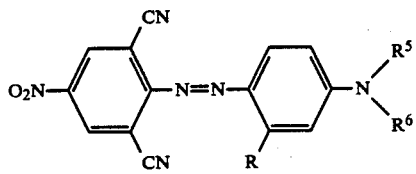

in which Hal denotes bromine or chlorine, $R^1$ and $R^2$, independently of one another, denote methyl or ethyl, $R^3$, $R^4$, $R^5$ and $R^6$, independently of one another, denote linear alkyl having 1 to 4 carbon atoms or alkenyl having 3 or 4 carbon atoms, R denotes methyl or acylamino from the series consisting of acetylamino, propionylamino, i-butyrylamino or n-butyrylamino, it being possible in a mixture containing more than one dye of the general formula II for R to denote either only methyl or only acylamino.

The invention also relates to processes for the preparation of the dye mixtures according to the invention and also to the use thereof for dyeing and printing hydrophobic fibre materials and mixtures thereof with natural fibres.

It is already known that mixtures of at least two different individual dyes of the general formula II have improved colouristic properties compared to the individual dyes (cf. German Auslegeschrift 2,234,465(corresponding to U.S. Pat. No. 3,954,395) and European Patent 93,935).

Surprisingly, it has now been found that the mixtures according to the invention have substantially improved colouristic properties compared to the individual dyes and in part also compared to the mixtures of German Auslegeschrift 2,234,465 and European Patent 93,935.

The dye mixtures according to the invention consist of one or more dyes of the general formula I and one or more dyes of the general formula II. Those dye mixtures according to the invention are preferred which consist of one or two dyes each of the general formulae I or II.

Those dye mixtures are also preferred which consist of dyes of the general formula I and II in which $R^1$ and $R^2$ denote methyl and/or $R^3$ and $R^4$, independently of one another, denote ethyl, n-propyl or allyl and/or $R^5$ and $R^6$, independently of one another, denote ethyl or n-propyl.

Preferred mixtures are also present in the case where $R^3$ and $R^4$ or $R^5$ and $R^6$ are identical.

Furthermore preferred mixtures are present in the case where R denotes methyl, actylamino, i-butyrylamino or n-butyrylamino.

If the mixture according to the invention contains more than one dye of the general formula II, R stands preferably for the combinations acetylamino/i-butyrylamino, propionylamino/i-butyrylamino, propionylamino/n-butyrylamino, i-butyrylamino/n-butyrylamino or in particular the combination acetylamino/n-butyrylamino.

Further preferred mixtures containing more than one dye of the general formula II are those in which $R^5$ and $R^6$ within one dye are identical but different from dye to dye. Preferred combinations for $R^5$ and $R^6$ are in this case ethyl/n-butyl, n-propyl/n-butyl and in particular ethyl/n-propyl.

Particularly preferred dye mixtures are those in which several one preferred characteristics come together.

Very particularly preferred dye mixtures are those consisting of dyes of the general formulae I and II in which Hal stands for bromine, $R^1$ and $R^2$ stand for methyl, $R^3$ and $R^4$ are identical to one another and stand for ethyl or allyl, $R^5$ and $R^6$ stand for ethyl and R stands for acetylamino or n-butyrylamino. If the mixture contains more than one dye of the general formula II, R very particularly preferably also stands for the combination acetylamino-butyrylamino. Further preferred mixtures containing more than one dye of the general formula II are those in which R stands for acetylamino and $R^5$ and $R^6$ are identical within one dye but different from dye to dye and stand for the combination ethyl/n-propyl.

In the dye mixtures according to the invention, the ratio of the various dyes of the general formulae I and II can vary within relatively wide limits. In general the minimum relative weight of one component is 10% and the maximum relative weight 90%. In the case of dye mixtures consisting only of one dye each of the general formulae I and II, a quantitative ratio of 70/30 to 30/70 is preferred, that is, the relative weight of one dye is 30 to 70%.

The individual dyes of the general formulae I and II are known and described, for example, in German Patent 1,794,402 (corresponding to U.S. Pat. Nos. 3,962,209, 4,105,655 and 4,237,048), European Patent 36,512, U.S. Pat. No. 4,076,498 or Japanese Patent Application J 81/009,596.

The dye mixtures according to the invention can be prepared by various processes, for example by mixing the separately prepared and separately formulated individual dyes. This mixing process is carried out in suitable mixers such as, for example, tumblers, in suitable mills, for example ball and sand mills. However, it is also possible to mix separately formulated individual dyes by stirring them into dyeing liquors.

Preferably the mixtures according to the invention are obtained by joint formulation of the separately prepared individual components.

This joint formulation is characterized in that a dye mixture of at least one dye each of the general formulae I and II is milled in the presence of dispersants in suitable mills such as, for example, ball or sand mills and, in the case where the preparation of a pulverulent dye formulation is desired, subsequently spray-dried.

Examples of suitable dispersants are anionic or nonionic dispersants, which can also be used together. Examples of anionic dispersants are condensation products from aromatic sulfonic acids and formaldehyde, in particular condensation products for alkylnaphthalenesulfonic acids and formaldehyde, condensation products from substituted or unsubstituted phenol with formaldehyde and sodium bisulfite, alkali metal salts of condensation products from substituted or unsubstituted phenol, naphthalene-or naphtholsulfonic acids, formaldehyde and sodium bisulfite, alkali metal salts of condensation products from substituted or unsubstituted phenolsulfonic acids, formaldehyde and urea and also alkali metal salts of lignosulfonic acids; alkyl- or alkylarylsulfonates and also alkylaryl polyglycol ether sulfates. Examples of nonionic dispersants or emulsifiers are reaction products of alkylene oxides, such as, for example, ethylene oxide or propylene oxide having alkylatable compounds, such as, for example fatty alcohols, fatty amines, fatty acids, phenols, alkylphenols, arylalkylphenols, arylalkylarylphenols and carboxamides such as, for example, addition products of 5 to 10 ethylene oxide units with $C_8$–$C_{10}$-alkylphenols.

The milling is carried out at temperatures between 10° and 90° C., preferably at 30° to 60° C. For the joint formulation of separately prepared individual components, the joint milling at temperatures above 30° C. is advantageous. The dye particles are comminuted mechanically to such an extent that an optimum specific surface area is obtained and sedimentation of the dye is kept to a minimum. The particle size of the dyes is in general between 0.5 and 5 μm, preferably at about 1 μm.

It is advantageous to subject the separately prepared individual components of the dye mixture before the joint milling to a joint thermal treatment. This thermal treatment is characterized in that the individual components of the dye mixture, if necessary under pressure, are heated in water for half an hour to several hours to temperatures of 50° to 150° C., preferably 90° to 130° C. and cooled again. This heating is advantageously carried out in the presence of one or more dispersants or an organic solvent. Solvents of this type are, for example, methanol, ethanol, dimethylformamide or dimethyl sulfoxide, preferably, however, they are slightly water-soluble solvents such as toluene, chlorobenzene, 1,2-dichlorobenzene or butyl acetate. These solvents are again distilled off after the thermal treatment.

A preferred pretreatment of the individual components of the dye mixture before the joint milling consists in the joint dissolution of the individual components in an organic solvent or solvent mixture followed by crystallization or precipitation, isolation, for example by filtration, and removal of solvent residues, for example by washing.

The dye dispersions thus obtained can be used very advantageously for mixing print pastes and dyeing liquors. They offer particular advantages, for example, in continuous processes in which, by continuous feed of the dye into the running apparatus, the dye concentration of the dyeing liquors must be kept constant.

For certain areas of application, powder formulations are preferred. These powders contain the dye, dispersant and other assistants such as, for example, wetting and oxidizing agents, preservatives and dust-removing agents.

A preferred preparation process for pulverulent dye formulations consists in removing the liquid from the liquid dye dispersions described above, for example by drying under vacuum, freeze-drying, by drying on drum dryers, preferably, however, by spray-drying.

The dye contents of the liquid dye formulations are 20 to 40% and the dispersant contents are about 20 to 40%. In powder formulations, the dye contents are 20 to 60% and the dispersant contents are 40 to 80%. For economic reasons, in most cases dye contents are not allowed to drop below 20%.

The dye mixtures according to the invention are highly suitable as such or even in a mixture with other dispersant dyes for dyeing and printing hydrophobic synthetic fibre materials and mixtures thereof with natural fibres. Surprisingly, they are superior to the individual dyes with respect to colouristic properties and colouristic fastness properties such as, for example, thermomigration, dry heat fixation, water, wash and crock fastness, in particular in build-up and exhaust properties and in levelling properties. In addition, the dye mixtures according to the invention still give very good strong dyeings in combination with a high degree of bath exhaustion, even if the dyeing temperatures are reduced and the dyeing time is shortened.

Examples of suitable hydrophobic synthetic materials are: secondary cellulose acetate, cellulose triacetate, polyamides and in particular polyesters such as, for example, polyethylene glycol terephthalate. Mixtures thereof with natural fibres are, for example, cotton, regenerated cellulose fibres or wool.

The invention is illustrated in more detail by the examples which follow:

EXAMPLE 1

14.7 g of the dye of the formula III

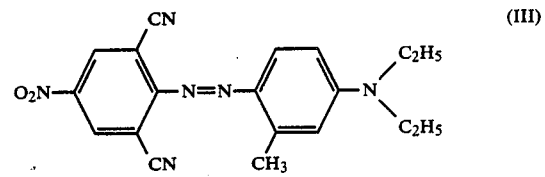

14.7 g of the dye of the formula IV

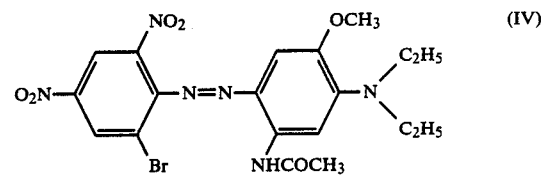

are homogenized together with 227.6 g of water, 86.8 g of a relatively high-molecular-weight ligninsulfonate and 6.3 g of an aryl polyglycol ether using a dissolver disk, and the pH of the mixture is brought to 8.0 with 2.6 ml of 50% strength acetic acid. This suspension is then milled in a water-cooled pearl mill down to a size distribution of <5μ, the paste thus obtained is screened to separate off the milling agent and then dried using a spray-dryer.

1.25 g of the dye thus obtained are dispersed in 2000 g of water. 4 g of ammonium sulfate, 2 g of a commercially available dispersant based on a condensation product from sodium naphthalenesulfonate and formaldehyde and 2 g of a condensation product from m-cresol, formaldehyde and sodium sulfite are added to the dispersion, which is then brought to a pH of 5.5 with acetic acid. The dyeing liquor thus obtained is entered with 100 g of a textured polyester fabric based on polyethylene glycol terephthalate, and the dyeing is carried out at 120° C. for ¼ hour. Subsequent rinsing, reductive aftertreatment with a 0.2% strength sodium dithionite solution for 15 minutes at 70° to 80° C., rinsing and drying gives a strong blue dyeing having very good colouristic properties.

The degree of exhaustion of the dye bath is tested by introducing 100 g of a textured polyester fabric based on polyethylene glycol terephthalate again into the dye bath and dyeing it for 1 hour at 135° C. and treating it as mentioned in the actual dyeing to give an almost colourless result.

EXAMPLE 2

0.12 g of the dye powder from Example 1 are stirred into 200 ml of water, and 0.2 g of a commercially available dispersant based on a condensation product from m-cresol, formaldehyde and sodium sulfite, 0.3 g of a commercially available carrier based on methylnaphthalene, 0.4 g of crystalline sodium acetate and also 1.2 ml of 30% strength acetic acid are added with stirring. The pH of the dye bath is 4.5. This dye bath is entered with 10 g of a polyester fabric based on polyethylene glycol terephthalate, and the dyeing is carried out in a dyeing autoclave under pressure at 106° C. for 1 hour. The dyeing is completed, as described above, by rinsing, reductive aftertreatment, rinsing again and drying to give likewise a strong blue dyeing having very good colouristic fastness properties.

EXAMPLE 3

The procedure as described in Example 1 is repeated, except that the 14.7 g of the dye of the formula III is replaced by the corresponding amount of the dye of the formula V

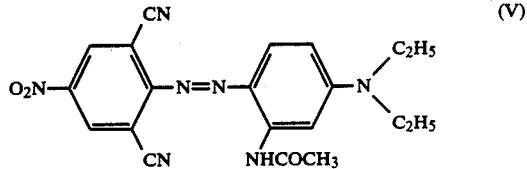

to give, also in this case, a strong blue dyeing having very good colouristic properties and giving only a weakly coloured result when additional material is dyed again in the same dye bath.

In the table which follows, further dye mixtures according to the invention are listed together with the meanings for R, $R^1$ and $R^2$ and the weight ratios of the individual dyes preparable by the abovementioned procedures and producing on polyester materials likewise strong blue dyeings or prints also having very good colouristic properties.

TABLE

| Ex. | Hal | $R^1$ | $R^2$ | $R^3$ | $R^4$ | $R^5$ | $R^6$ | R | Mixing ratio |
|---|---|---|---|---|---|---|---|---|---|
| 4 | Br | CH$_3$ | CH$_3$ | C$_2$H$_5$ | C$_2$H$_5$ | — | — | — | 45 |
|   | — | — | — | — | — | n-C$_3$H$_7$ | n-C$_3$H$_7$ | CH$_3$ | 55 |
| 5 | Br | CH$_3$ | CH$_3$ | C$_2$H$_5$ | C$_2$H$_5$ | — | — | — | 35 |
|   | — | — | — | — | — | C$_2$H$_5$ | n-C$_3$H$_7$ | CH$_3$ | 65 |
| 6 | Br | CH$_3$ | CH$_3$ | C$_2$H$_5$ | C$_2$H$_5$ | — | — | — | 60 |
|   | — | — | — | — | — | CH$_3$ | n-C$_4$H$_9$ | CH$_3$ | 40 |
| 7 | Br | CH$_3$ | CH$_3$ | C$_2$H$_5$ | C$_2$H$_5$ | — | — | — | 50 |
|   | — | — | — | — | — | C$_2$H$_5$ | C$_2$H$_5$ | NHCOC$_2$H$_5$ | 50 |
| 8 | Br | CH$_3$ | CH$_3$ | C$_2$H$_5$ | C$_2$H$_5$ | — | — | — | 25 |
|   | — | — | — | — | — | C$_2$H$_5$ | C$_2$H$_5$ | NHCOnC$_3$H$_7$ | 75 |
| 9 | Br | CH$_3$ | CH$_3$ | C$_2$H$_5$ | C$_2$H$_5$ | — | — | — | 55 |
|   | — | — | — | — | — | C$_2$H$_5$ | C$_2$H$_5$ | NHCOiC$_3$H$_7$ | 45 |
| 10 | Br | CH$_3$ | CH$_3$ | C$_2$H$_5$ | C$_2$H$_5$ | — | — | — | 65 |
|   | — | — | — | — | — | n-C$_3$H$_7$ | n-C$_3$H$_7$ | NHCOCH$_3$ | 35 |
| 11 | Br | CH$_3$ | CH$_3$ | C$_2$H$_5$ | C$_2$H$_5$ | — | — | — | 45 |
|   | — | — | — | — | — | n-C$_3$H$_7$ | n-C$_3$H$_7$ | NHCOC$_2$H$_5$ | 55 |
| 12 | Br | CH$_3$ | CH$_3$ | C$_2$H$_5$ | C$_2$H$_5$ | — | — | — | 50 |
|   | — | — | — | — | — | CH$_3$ | n-C$_3$H$_7$ | NHCOCH$_3$ | 50 |
| 13 | Br | CH$_3$ | CH$_3$ | C$_2$H$_5$ | C$_2$H$_5$ | — | — | — | 35 |
|   | — | — | — | — | — | C$_2$H$_5$ | n-C$_4$H$_9$ | NHCOCH$_3$ | 65 |
| 14 | Br | CH$_3$ | CH$_3$ | C$_2$H$_5$ | C$_2$H$_5$ | — | — | — | 35 |
|   | — | — | — | — | — | C$_2$H$_5$ | n-C$_3$H$_7$ | NHCOnC$_3$H$_7$ | 65 |
| 15 | Br | CH$_3$ | CH$_3$ | C$_2$H$_5$ | C$_2$H$_5$ | — | — | — | 45 |
|   | — | — | — | — | — | CH$_3$ | n-C$_3$H$_7$ | NHCOCH$_3$ | 55 |
| 16 | Cl | CH$_3$ | CH$_3$ | C$_2$H$_5$ | C$_2$H$_5$ | — | — | — | 40 |
|   | — | — | — | — | — | C$_2$H$_5$ | C$_2$H$_5$ | CH$_3$ | 60 |
| 17 | Cl | CH$_3$ | CH$_3$ | C$_2$H$_5$ | C$_2$H$_5$ | — | — | — | 60 |
|   | — | — | — | — | — | C$_2$H$_5$ | n-C$_3$H$_7$ | CH$_3$ | 40 |
| 18 | Cl | CH$_3$ | CH$_3$ | C$_2$H$_5$ | C$_2$H$_5$ | — | — | — | 35 |
|   | — | — | — | — | — | n-C$_3$H$_7$ | n-C$_3$H$_7$ | CH$_3$ | 65 |
| 19 | Cl | CH$_3$ | CH$_3$ | C$_2$H$_5$ | C$_2$H$_5$ | — | — | — | 50 |
|   | — | — | — | — | — | C$_2$H$_5$ | C$_2$H$_5$ | NHCOCH$_3$ | 50 |
| 20 | Cl | CH$_3$ | CH$_3$ | C$_2$H$_5$ | C$_2$H$_5$ | — | — | — | 35 |
|   | — | — | — | — | — | C$_2$H$_5$ | n-C$_3$H$_7$ | NHCOCH$_3$ | 65 |
| 21 | Cl | CH$_3$ | CH$_3$ | C$_2$H$_5$ | C$_2$H$_5$ | — | — | — | 65 |
|   | — | — | — | — | — | n-C$_3$H$_7$ | n-C$_3$H$_7$ | NHCOCH$_3$ | 35 |
| 22 | Cl | CH$_3$ | CH$_3$ | C$_2$H$_5$ | C$_2$H$_5$ | — | — | — | 50 |
|   | — | — | — | — | — | C$_2$H$_5$ | C$_2$H$_5$ | NHCOC$_2$H$_5$ | 50 |
| 23 | Cl | CH$_3$ | CH$_3$ | C$_2$H$_5$ | C$_2$H$_5$ | — | — | — | 50 |
|   | — | — | — | — | — | C$_2$H$_5$ | C$_2$H$_5$ | NHCOnC$_3$H$_7$ | 50 |
| 24 | Cl | CH$_3$ | CH$_3$ | C$_2$H$_5$ | C$_2$H$_5$ | — | — | — | 45 |
|   | — | — | — | — | — | C$_2$H$_5$ | C$_2$H$_5$ | NHCOiC$_3$H$_7$ | 55 |
| 25 | Cl | CH$_3$ | CH$_3$ | C$_2$H$_5$ | C$_2$H$_5$ | — | — | — | 55 |
|   | — | — | — | — | — | CH$_3$ | n-C$_3$H$_7$ | NHCOnC$_3$H$_7$ | 45 |
| 26 | Br | CH$_3$ | CH$_3$ | CH$_2$CH=CH$_2$ | CH$_2$CH=CH$_2$ | — | — | — | 65 |
|   | — | — | — | — | — | C$_2$H$_5$ | C$_2$H$_5$ | CH$_3$ | 35 |

TABLE-continued

| Ex. | Hal | R¹ | R² | R³ | R⁴ | R⁵ | R⁶ | R | Mixing ratio |
|---|---|---|---|---|---|---|---|---|---|
| 27 | Br | CH₃ | CH₃ | CH₂CH=CH₂ | CH₂CH=CH₂ | — | — | — | 60 |
|  | — | — | — | — | — | CH₃ | n-C₃H₇ | CH₃ | 40 |
| 28 | Br | CH₃ | CH₃ | CH₂CH=CH₂ | CH₂CH=CH₂ | — | — | — | 70 |
|  | — | — | — | — | — | n-C₃H₇ | n-C₃H₇ | CH₃ | 30 |
| 29 | Br | CH₃ | CH₃ | CH₂CH=CH₂ | CH₂CH=CH₂ | — | — | — | 50 |
|  | — | — | — | — | — | C₂H₅ | C₂H₅ | NHCOCH₃ | 50 |
| 30 | Br | CH₃ | CH₃ | CH₂CH=CH₂ | CH₂CH=CH₂ | — | — | — | 50 |
|  | — | — | — | — | — | C₂H₅ | C₂H₅ | NHCOC₂H₅ | 50 |
| 31 | Br | CH₃ | CH₃ | CH₂CH=CH₂ | CH₂CH=CH₂ | — | — | — | 60 |
|  | — | — | — | — | — | C₂H₅ | C₂H₅ | NHCOnC₃H₇ | 40 |
| 32 | Br | CH₃ | CH₃ | CH₂CH=CH₂ | CH₂CH=CH₂ | — | — | — | 35 |
|  | — | — | — | — | — | C₂H₅ | C₂H₅ | NHCOiC₃H₇ | 65 |
| 33 | Br | CH₃ | CH₃ | CH₂CH=CH₂ | CH₂CH=CH₂ | — | — | — | 50 |
|  | — | — | — | — | — | n-C₃H₇ | n-C₃H₇ | NHCOCH₃ | 50 |
| 34 | Br | CH₃ | CH₃ | CH₂CH=CH₂ | CH₂CH=CH₂ | — | — | — | 50 |
|  | — | — | — | — | — | CH₃ | n-C₃H₇ | NHCOCH₃ | 50 |
| 35 | Cl | CH₃ | CH₃ | CH₂CH=CH₂ | CH₂CH=CH₂ | — | — | — | 75 |
|  | — | — | — | — | — | C₂H₅ | C₂H₅ | CH₃ | 25 |
| 36 | Cl | CH₃ | CH₃ | CH₂CH=CH₂ | CH₂CH=CH₂ | — | — | — | 25 |
|  | — | — | — | — | — | CH₃ | n-C₃H₇ | CH₃ | 75 |
| 37 | Cl | CH₃ | CH₃ | CH₂CH=CH₂ | CH₂CH=CH₂ | — | — | — | 40 |
|  | — | — | — | — | — | n-C₃H₇ | n-C₃H₇ | CH₃ | 60 |
| 38 | Cl | CH₃ | CH₃ | CH₂CH=CH₂ | CH₂CH=CH₂ | — | — | — | 55 |
|  | — | — | — | — | — | C₂H₅ | C₂H₅ | NHCOCH₃ | 45 |
| 39 | Cl | CH₃ | CH₃ | CH₂CH=CH₂ | CH₂CH=CH₂ | — | — | — | 60 |
|  | — | — | — | — | — | C₂H₅ | C₂H₅ | NHCOC₂H₅ | 40 |
| 40 | Cl | CH₃ | CH₃ | CH₂CH=CH₂ | CH₂CH=CH₂ | — | — | — | 30 |
|  | — | — | — | — | — | C₂H₅ | C₂H₅ | NHCOnC₃H₇ | 70 |
| 41 | Cl | CH₃ | CH₃ | CH₂CH=CH₂ | CH₂CH=CH₂ | — | — | — | 50 |
|  | — | — | — | — | — | n-C₃H₇ | n-C₃H₇ | NHCOCH₃ | 50 |
| 42 | Cl | CH₃ | CH₃ | CH₂CH=CH₂ | CH₂CH=CH₂ | — | — | — | 80 |
|  | — | — | — | — | — | CH₃ | n-C₃H₇ | NHCOCH₃ | 20 |
| 43 | Br | CH₃ | CH₃ | C₂C₅ | C₂C₅ | — | — | — | 45 |
|  | — | — | — | — | — | CH₂CH=CH₂ | CH₂CH=CH₂ | CH₃ | 55 |
| 44 | Br | CH₃ | CH₃ | C₂C₅ | C₂C₅ | — | — | — | 55 |
|  | — | — | — | — | — | CH₂CH=CH₂ | C₂H₅ | CH₃ | 45 |
| 45 | Br | CH₃ | CH₃ | C₂C₅ | C₂C₅ | — | — | — | 50 |
|  | — | — | — | — | — | CH₂CH=CH₂ | CH₂CH=CH₂ | NHCOCH₃ | 50 |
| 46 | Br | CH₃ | CH₃ | C₂C₅ | C₂C₅ | — | — | — | 65 |
|  | — | — | — | — | — | CH₂CH=CH₂ | CH₂CH=CH₂ | NHCOC₂H₅ | 35 |
| 47 | Br | CH₃ | CH₃ | C₂C₅ | C₂C₅ | — | — | — | 35 |
|  | — | — | — | — | — | CH₂CH=CH₂ | CH₂CH=CH₂ | NHCOnC₃H₇ | 65 |
| 48 | Br | CH₃ | CH₃ | C₂C₅ | C₂C₅ | — | — | — | 45 |
|  | — | — | — | — | — | CH₂CH=CH₂ | C₂H₅ | NHCOCH₃ | 55 |
| 49 | Cl | CH₃ | CH₃ | C₂C₅ | C₂C₅ | — | — | — | 55 |
|  | — | — | — | — | — | CH₂CH=CH₂ | CH₂CH=CH₂ | CH₃ | 45 |
| 50 | Cl | CH₃ | CH₃ | C₂C₅ | C₂C₅ | — | — | — | 50 |
|  | — | — | — | — | — | CH₂CH=CH₂ | CH₂CH=CH₂ | NHCOCH₃ | 50 |
| 51 | Cl | CH₃ | CH₃ | C₂C₅ | C₂C₅ | — | — | — | 20 |
|  | — | — | — | — | — | CH₂CH=CH₂ | CH₂CH=CH₂ | NHCOC₂H₅ | 80 |
| 52 | Cl | CH₃ | CH₃ | C₂C₅ | C₂C₅ | — | — | — | 90 |
|  | — | — | — | — | — | C₂H₅ | CH₂CH=CH₂ | NHCOCH₃ | 10 |
| 53 | Br | CH₃ | CH₃ | CH₂CH=CH₂ | CH₂CH=CH₂ | — | — | — | 70 |
|  | — | — | — | — | — | CH₂CH=CH₂ | CH₂CH=CH₂ | NHCOCH₃ | 30 |
| 54 | Br | CH₃ | CH₃ | CH₂CH=CH₂ | CH₂CH=CH₂ | — | — | — | 85 |
|  | — | — | — | — | — | CH₂CH=CH₂ | CH₂CH=CH₂ | CH₃ | 15 |
| 55 | Cl | CH₃ | CH₃ | CH₂CH=CH₂ | CH₂CH=CH₂ | — | — | — | 75 |
|  | — | — | — | — | — | CH₂CH=CH₂ | CH₂CH=CH₂ | CH₃ | 25 |
| 56 | Cl | CH₃ | CH₃ | CH₂CH=CH₂ | CH₂CH=CH₂ | — | — | — | 70 |
|  | — | — | — | — | — | CH₂CH=CH₂ | CH₂CH=CH₂ | NHCOCH₃ | 30 |
| 57 | Br | C₂H₅ | CH₃ | C₂H₅ | C₂H₅ | — | — | — | 45 |
|  | — | — | — | — | — | C₂H₅ | C₂H₅ | CH₃ | 55 |
| 58 | Br | C₂H₅ | CH₃ | C₂H₅ | C₂H₅ | — | — | — | 50 |
|  | — | — | — | — | — | C₂H₅ | C₂H₅ | NHCOCH₃ | 50 |
| 59 | Br | C₂H₅ | CH₃ | C₂H₅ | C₂H₅ | — | — | — | 35 |
|  | — | — | — | — | — | C₂H₅ | C₂H₅ | NHCOC₂H₅ | 65 |
| 60 | Br | C₂H₅ | CH₃ | C₂H₅ | C₂H₅ | — | — | — | 70 |
|  | — | — | — | — | — | n-C₃H₇ | n-C₃H₇ | CH₃ | 30 |
| 61 | Br | C₂H₅ | CH₃ | C₂H₅ | C₂H₅ | — | — | — | 40 |
|  | — | — | — | — | — | C₂H₅ | C₂H₅ | NHCOnC₃H₇ | 60 |
| 62 | Cl | C₂H₅ | CH₃ | C₂H₅ | C₂H₅ | — | — | — | 50 |
|  | — | — | — | — | — | C₂H₅ | C₂H₅ | CH₃ | 50 |
| 63 | Cl | C₂H₅ | CH₃ | C₂H₅ | C₂H₅ | — | — | — | 55 |
|  | — | — | — | — | — | C₂H₅ | C₂H₅ | NHCOCH₃ | 45 |
| 64 | Cl | C₂H₅ | CH₃ | C₂H₅ | C₂H₅ | — | — | — | 35 |
|  | — | — | — | — | — | n-C₃H₇ | n-C₃H₇ | NHCOCH₃ | 65 |
| 65 | Cl | C₂H₅ | CH₃ | C₂H₅ | C₂H₅ | — | — | — | 65 |
|  | — | — | — | — | — | C₂H₅ | C₂H₅ | NHCOnC₃H₇ | 35 |
| 66 | Br | C₂H₅ | CH₃ | C₂H₅ | C₂H₅ | — | — | — | 70 |
|  | — | — | — | — | — | CH₂CH=CH₂ | CH₂CH=CH₂ | CH₃ | 30 |
| 67 | Br | C₂H₅ | CH₃ | C₂H₅ | C₂H₅ | — | — | — | 35 |

TABLE-continued

| Ex. | Hal | R¹ | R² | R³ | R⁴ | R⁵ | R⁶ | R | Mixing ratio |
|---|---|---|---|---|---|---|---|---|---|
| | | | | | | $CH_2CH=CH_2$ | $CH_2CH=CH_2$ | $NHCOCH_3$ | 65 |
| 68 | Cl | $C_2H_5$ | $CH_3$ | $C_2H_5$ | $C_2H_5$ | — | — | — | 45 |
| | — | — | — | — | — | $CH_2CH=CH_2$ | $CH_2CH=CH_2$ | $NHCOC_2H_5$ | 55 |
| 69 | Br | $C_2H_5$ | $CH_3$ | $CH_2CH=CH_2$ | $CH_2CH=CH_2$ | — | — | — | 50 |
| | — | — | — | — | — | $C_2H_5$ | $C_2H_5$ | $CH_3$ | 50 |
| 70 | Br | $C_2H_5$ | $CH_3$ | $CH_2CH=CH_2$ | $CH_2CH=CH_2$ | — | — | — | 50 |
| | — | — | — | — | — | $C_2H_5$ | $C_2H_5$ | $NHCOCH_3$ | 50 |
| 71 | Cl | $C_2H_5$ | $CH_3$ | $CH_2CH=CH_2$ | $CH_2CH=CH_2$ | — | — | — | 40 |
| | — | — | — | — | — | $C_2H_5$ | $C_2H_5$ | $CH_3$ | 60 |
| 72 | Cl | $C_2H_5$ | $CH_3$ | $CH_2CH=CH_2$ | $CH_2CH=CH_2$ | — | — | — | 60 |
| | — | — | — | — | — | $C_2H_5$ | $C_2H_5$ | $NHCOnC_3H_7$ | 40 |
| 73 | Br | $CH_3$ | $C_2H_5$ | $C_2H_5$ | $C_2H_5$ | — | — | — | 45 |
| | — | — | — | — | — | $C_2H_5$ | $C_2H_5$ | $CH_3$ | 55 |
| 74 | Br | $CH_3$ | $C_2H_5$ | $C_2H_5$ | $C_2H_5$ | — | — | — | 50 |
| | — | — | — | — | — | $C_2H_5$ | $C_2H_5$ | $NHCOnC_3H_7$ | 50 |
| 75 | Br | $CH_3$ | $C_2H_5$ | $C_2H_5$ | $C_2H_5$ | — | — | — | 65 |
| | — | — | — | — | — | $n\text{-}C_3H_7$ | $n\text{-}C_3H_7$ | $NHCOCH_3$ | 35 |
| 76 | Cl | $CH_3$ | $C_2H_5$ | $C_2H_5$ | $C_2H_5$ | — | — | — | 55 |
| | — | — | — | — | — | $C_2H_5$ | $C_2H_5$ | $NHCOCH_3$ | 45 |
| 77 | Br | $CH_3$ | $C_2H_5$ | $CH_2CH=CH_2$ | $CH_2CH=CH_2$ | — | — | — | 50 |
| | — | — | — | — | — | $C_2H_5$ | $C_2H_5$ | $CH_3$ | 50 |
| 78 | Cl | $CH_3$ | $C_2H_5$ | $CH_2CH=CH_2$ | $CH_2CH=CH_2$ | — | — | — | 50 |
| | — | — | — | — | — | $C_2H_5$ | $C_2H_5$ | $NHCOCH_3$ | 50 |
| 79 | Br | $CH_3$ | $CH_3$ | $C_2H_5$ | $n\text{-}C_3H_7$ | — | — | — | 40 |
| | — | — | — | — | — | $C_2H_5$ | $C_2H_5$ | $CH_3$ | 60 |
| 80 | Br | $CH_3$ | $CH_3$ | $n\text{-}C_3H_7$ | $n\text{-}C_3H_7$ | — | — | — | 35 |
| | — | — | — | — | — | $C_2H_5$ | $C_2H_5$ | $NHCOCH_3$ | 65 |
| 81 | Br | $CH_3$ | $CH_3$ | $n\text{-}C_3H_7$ | $n\text{-}C_3H_7$ | — | — | — | 60 |
| | — | — | — | — | — | $C_2H_5$ | $C_2H_5$ | $CH_3$ | 40 |
| 82 | Br | $CH_3$ | $CH_3$ | $CH_3$ | $n\text{-}C_4H_9$ | — | — | — | 50 |
| | — | — | — | — | — | $C_2H_5$ | $C_2H_5$ | $NHCOnC_3H_7$ | 50 |
| 83 | Br | $CH_3$ | $CH_3$ | $CH_2CH=CH_2$ | $n\text{-}C_3H_7$ | — | — | — | 55 |
| | — | — | — | — | — | $n\text{-}C_3H_7$ | $n\text{-}C_3H_7$ | $NHCOCH_3$ | 45 |
| 84 | Cl | $CH_3$ | $CH_3$ | $n\text{-}C_3H_7$ | $n\text{-}C_3H_7$ | — | — | — | 40 |
| | — | — | — | — | — | $C_2H_5$ | $C_2H_5$ | $CH_3$ | 60 |
| 85 | Cl | $CH_3$ | $CH_3$ | $C_2H_5$ | $n\text{-}C_4H_9$ | — | — | — | 50 |
| | — | — | — | — | — | $C_2H_5$ | $C_2H_5$ | $NHCOCH_3$ | 50 |
| 86 | Br | $CH_3$ | $CH_3$ | $C_2H_5$ | $C_2H_5$ | — | — | — | 50 |
| | — | — | — | — | — | $C_2H_5$ | $C_2H_5$ | $NHCOCH_3$ | 25 |
| | — | — | — | — | — | $n\text{-}C_3H_7$ | $n\text{-}C_3H_7$ | $NHCOCH_3$ | 25 |
| 87 | Br | $CH_3$ | $CH_3$ | $C_2H_5$ | $C_2H_5$ | — | — | — | 33⅓ |
| | — | — | — | — | — | $C_2H_5$ | $C_2H_5$ | $NHCOCH_3$ | 33⅓ |
| | — | — | — | — | — | $C_2H_5$ | $C_2H_5$ | $NHCOnC_3H_7$ | 33⅓ |
| 88 | Br | $CH_3$ | $CH_3$ | $C_2H_5$ | $C_2H_5$ | — | — | — | 60 |
| | — | — | — | — | — | $n\text{-}C_3H_7$ | $n\text{-}C_3H_7$ | $NHCOCH_3$ | 20 |
| | — | — | — | — | — | $C_2H_5$ | $C_2H_5$ | $NHCOnC_3H_7$ | 20 |
| 89 | Br | $CH_3$ | $CH_3$ | $C_2H_5$ | $C_2H_5$ | — | — | — | 30 |
| | — | — | — | — | — | $n\text{-}C_3H_7$ | $n\text{-}C_3H_7$ | $CH_3$ | 40 |
| | — | — | — | — | — | $C_2H_5$ | $C_2H_5$ | $CH_3$ | 30 |
| 90 | Cl | $CH_3$ | $CH_3$ | $C_2H_5$ | $C_2H_5$ | — | — | — | 45 |
| | — | — | — | — | — | $C_2H_5$ | $C_2H_5$ | $NHCOCH_3$ | 15 |
| | — | — | — | — | — | $C_2H_5$ | $C_2H_5$ | $NHCOnC_3H_7$ | 40 |
| 91 | Cl | $CH_3$ | $CH_3$ | $C_2H_5$ | $C_2H_5$ | — | — | — | 40 |
| | — | — | — | — | — | $C_2H_5$ | $C_2H_5$ | $NHCOCH_3$ | 30 |
| | — | — | — | — | — | $n\text{-}C_3H_7$ | $n\text{-}C_3H_7$ | $NHCOCH_3$ | 30 |
| 92 | Br | $CH_3$ | $CH_3$ | $C_2H_5$ | $C_2H_5$ | — | — | — | 50 |
| | — | — | — | — | — | $CH_2CH=CH_2$ | $CH_2CH=CH_2$ | $NHCOCH_3$ | 25 |
| | — | — | — | — | — | $C_2H_5$ | $C_2H_5$ | $NHCOnC_3H_7$ | 25 |
| 93 | Cl | $CH_3$ | $CH_3$ | $C_2H_5$ | $C_2H_5$ | — | — | — | 40 |
| | — | — | — | — | — | $CH_2CH=CH_2$ | $CH_2CH=CH_2$ | $NHCOC_2H_5$ | 30 |
| | — | — | — | — | — | $C_2H_5$ | $C_2H_5$ | $NHCOCH_3$ | 30 |
| 94 | Br | $CH_3$ | $CH_3$ | $CH_2CH=CH_2$ | $CH_2CH=CH_2$ | — | — | — | 40 |
| | — | — | — | — | — | $C_2H_5$ | $C_2H_5$ | $NHCOCH_3$ | 40 |
| | — | — | — | — | — | $C_2H_5$ | $C_2H_5$ | $NHCOnC_3H_7$ | 20 |
| 95 | Br | $CH_3$ | $CH_3$ | $CH_2CH=CH_2$ | $CH_2CH=CH_2$ | — | — | — | 50 |
| | — | — | — | — | — | $C_2H_5$ | $C_2H_5$ | $NHCOCH_3$ | 25 |
| | — | — | — | — | — | $n\text{-}C_3H_7$ | $n\text{-}C_3H_7$ | $NHCOCH_3$ | 25 |
| 96 | Br | $CH_3$ | $CH_3$ | $CH_2CH=CH_2$ | $CH_2CH=CH_2$ | — | — | — | 60 |
| | — | — | — | — | — | $C_2H_5$ | $C_2H_5$ | $NHCOCH_3$ | 20 |
| | — | — | — | — | — | $C_2H_5$ | $C_2H_5$ | $NHCOnC_3H_7$ | 10 |
| | — | — | — | — | — | $n\text{-}C_3H_7$ | $n\text{-}C_3H_7$ | $NHCOCH_3$ | 10 |
| 97 | Br | $CH_3$ | $CH_3$ | $CH_2CH=CH_2$ | $CH_2CH=CH_2$ | — | — | — | 50 |
| | — | — | — | — | — | $C_2H_5$ | $C_2H_5$ | $CH_3$ | 30 |
| | — | — | — | — | — | $n\text{-}C_3H_7$ | $n\text{-}C_3H_7$ | $CH_3$ | 20 |
| 98 | Br | $CH_3$ | $CH_3$ | $CH_2CH=CH_2$ | $CH_2CH=CH_2$ | — | — | — | 40 |
| | — | — | — | — | — | $C_2H_5$ | $C_2H_5$ | $CH_3$ | 30 |
| | — | — | — | — | — | $C_2H_5$ | $n\text{-}C_3H_7$ | $CH_3$ | 30 |
| 99 | Cl | $CH_3$ | $CH_3$ | $CH_2CH=CH_2$ | $CH_2CH=CH_2$ | — | — | — | 60 |
| | — | — | — | — | — | $C_2H_5$ | $C_2H_5$ | $NHCOCH_3$ | 25 |
| | — | — | — | — | — | $C_2H_5$ | $C_2H_5$ | $NHCOnC_3H_7$ | 15 |
| 100 | Cl | $CH_3$ | $CH_3$ | $CH_2CH=CH_2$ | $CH_2CH=CH_2$ | — | — | — | 50 |

TABLE-continued

| Ex. | Hal | R¹ | R² | R³ | R⁴ | R⁵ | R⁶ | R | Mixing ratio |
|---|---|---|---|---|---|---|---|---|---|
| | — | — | — | — | — | $C_2H_5$ | $C_2H_5$ | $NHCOCH_3$ | 30 |
| | — | — | — | — | — | $n\text{-}C_3H_7$ | $n\text{-}C_3H_7$ | $NHCOCH_3$ | 20 |
| 101 | Cl | $CH_3$ | $CH_3$ | $CH_2CH\!=\!CH_2$ | $CH_2CH\!=\!CH_2$ | — | — | — | 70 |
| | — | — | — | — | — | $C_2H_5$ | $C_2H_5$ | $CH_3$ | 15 |
| | — | — | — | — | — | $n\text{-}C_3H_7$ | $n\text{-}C_3H_7$ | $CH_3$ | 15 |
| 102 | Br | $CH_3$ | $CH_3$ | $CH_2CH\!=\!CH_2$ | $CH_2CH\!=\!CH_2$ | — | — | — | 40 |
| | — | — | — | — | — | $CH_2CH\!=\!CH_2$ | $CH_2CH\!=\!CH_2$ | $NHCOCH_3$ | 40 |
| | — | — | — | — | — | $C_2H_5$ | $C_2H_5$ | $NHCOCH_3$ | 20 |
| 103 | Cl | $CH_3$ | $CH_3$ | $CH_2CH\!=\!CH_2$ | $CH_2CH\!=\!CH_2$ | — | — | — | 50 |
| | — | — | — | — | — | $C_2H_5$ | $C_2H_5$ | $CH_3$ | 45 |
| | — | — | — | — | — | $CH_2CH\!=\!CH_2$ | $CH_2CH\!=\!CH_2$ | $CH_3$ | 5 |

What is claimed is:

1. Mixture of monoazo dyes which contains one or more dyes of the formula

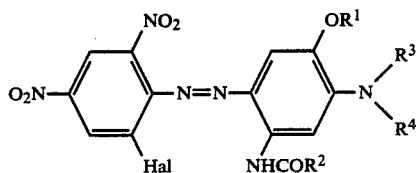

and one or more dyes of the formula II

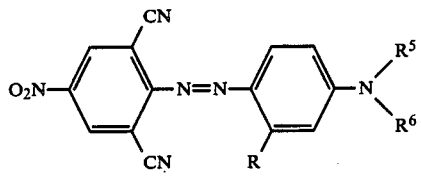

wherein Hal denotes bromo or chloro; $R^1$ and $R^2$, independently of one another each denote methyl or ethyl; $R^3$, $R^4$, $R^5$ and $R^6$, independently of one another, each denote linear alkyl having 1 to 4 carbon atoms or alkenyl having 3 to 4 carbon atoms; and R denotes methyl, acetylamino, propionylamino, i-butyrylamino, or n-butyrylamino.

2. Dye mixture according to claim 1 which contains one or two dyes each of formulae I and II.

3. Dye mixture according to claim 1 wherein the relative weight of a dye of the formula I or II is 10 to 90% by weight.

4. Dye mixture according to claim 1 which contains one dye each of formulae I and II and the relative weight of a dye of the formulae I or II is 30 to 70% by weight.

5. Dye mixture according to claim 1 wherein Hal denotes bromo; $R^1$ and $R^2$ are each methyl; $R^3$ and $R^4$ are identical to one another and are ethyl or allyl; $R^5$ and $R^6$ are each ethyl; and R is acetylamino or n-butyrylamino.

6. Dye mixture according to claim 1 which contains more than one dye of formula II and wherein R represents in one formula II dye acetylamino and n-butyrylamino in another formula II dye.

7. Dye mixture according to claim 1 which contains more than one dye of formula II wherein R is acetylamino and $R^5$ and $R^6$ are identical within one dye but different from dye to dye and represents in one formula II dye ethyl and n-propyl in another formula II dye.

* * * * *